UNITED STATES PATENT OFFICE.

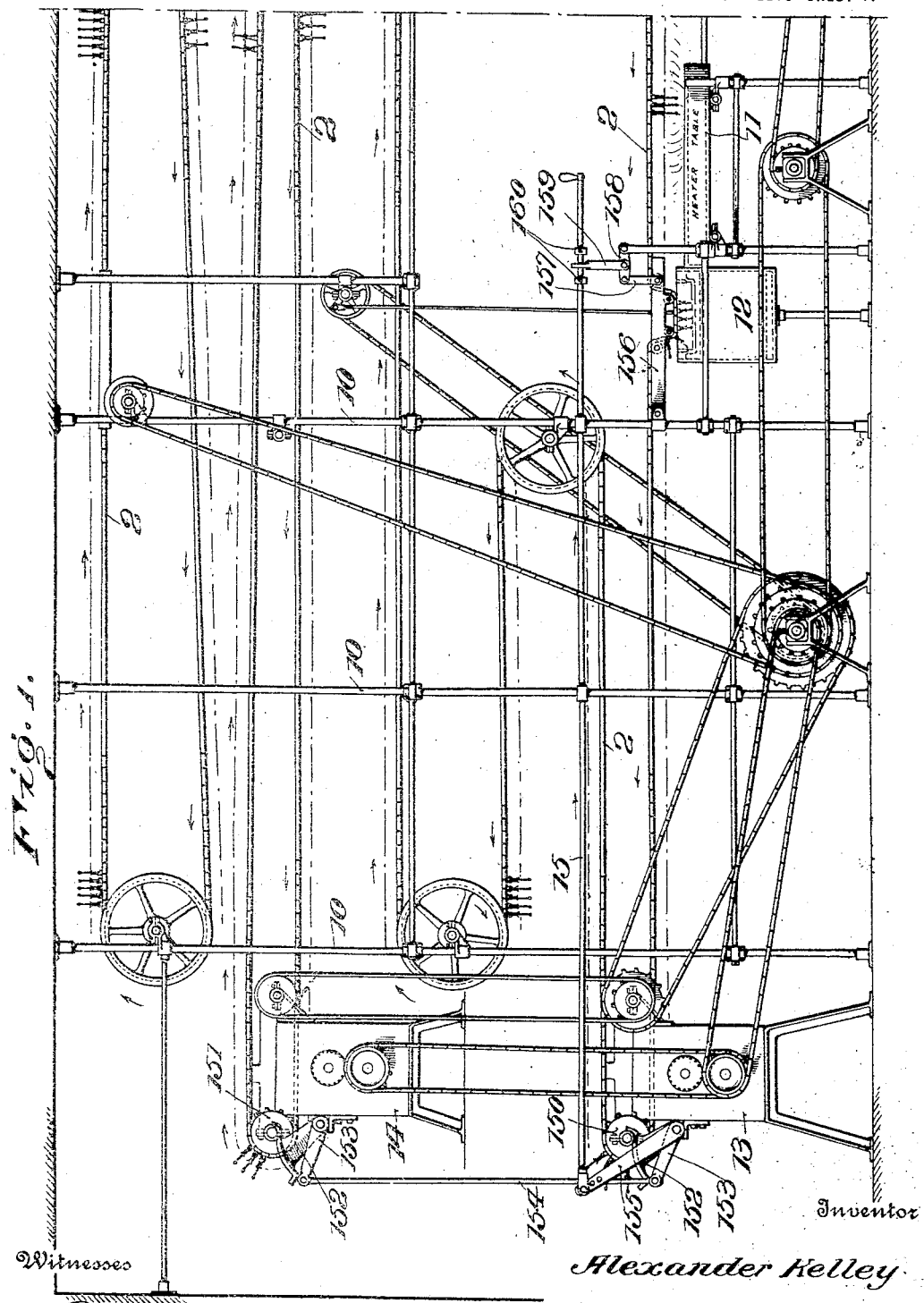

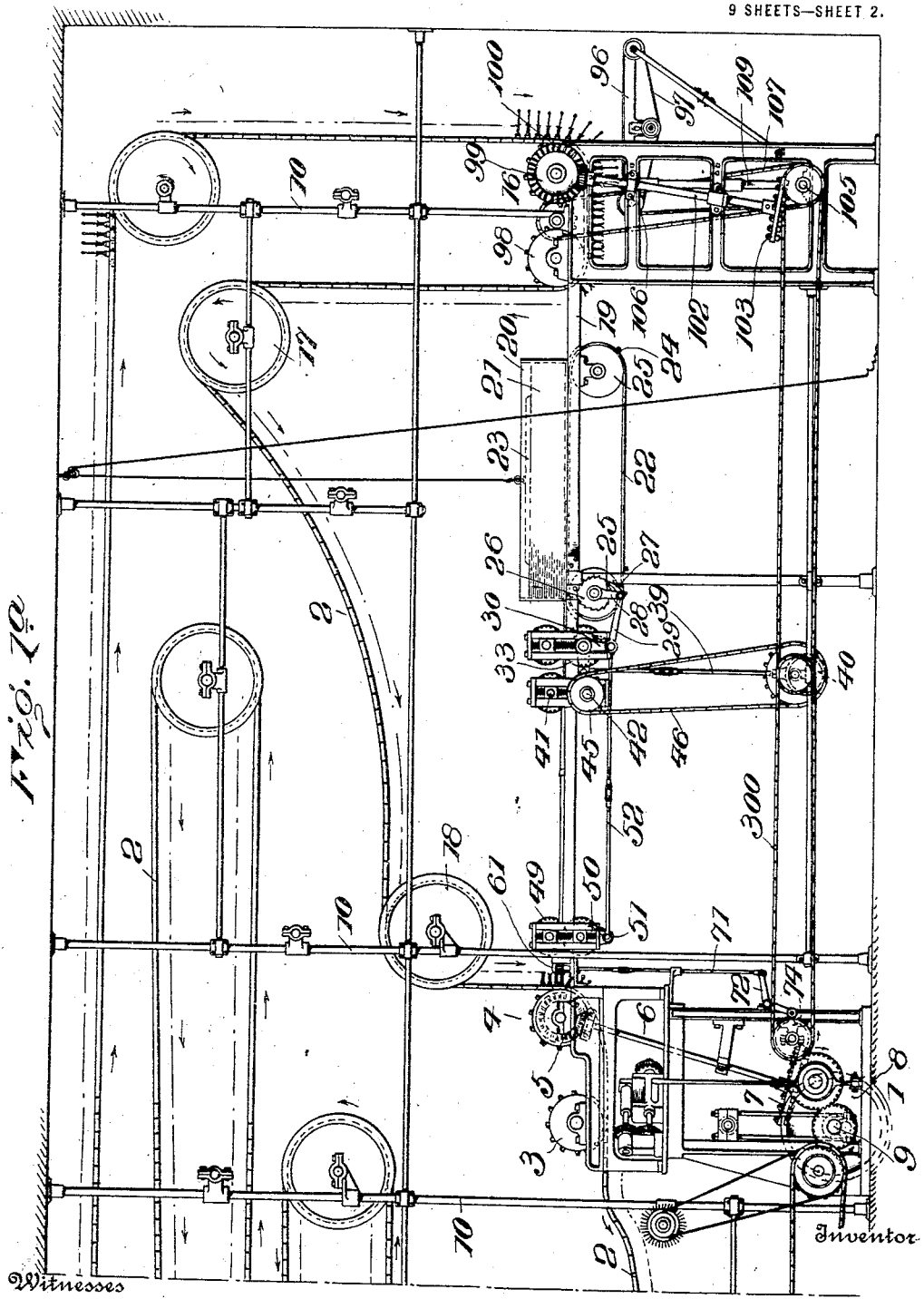

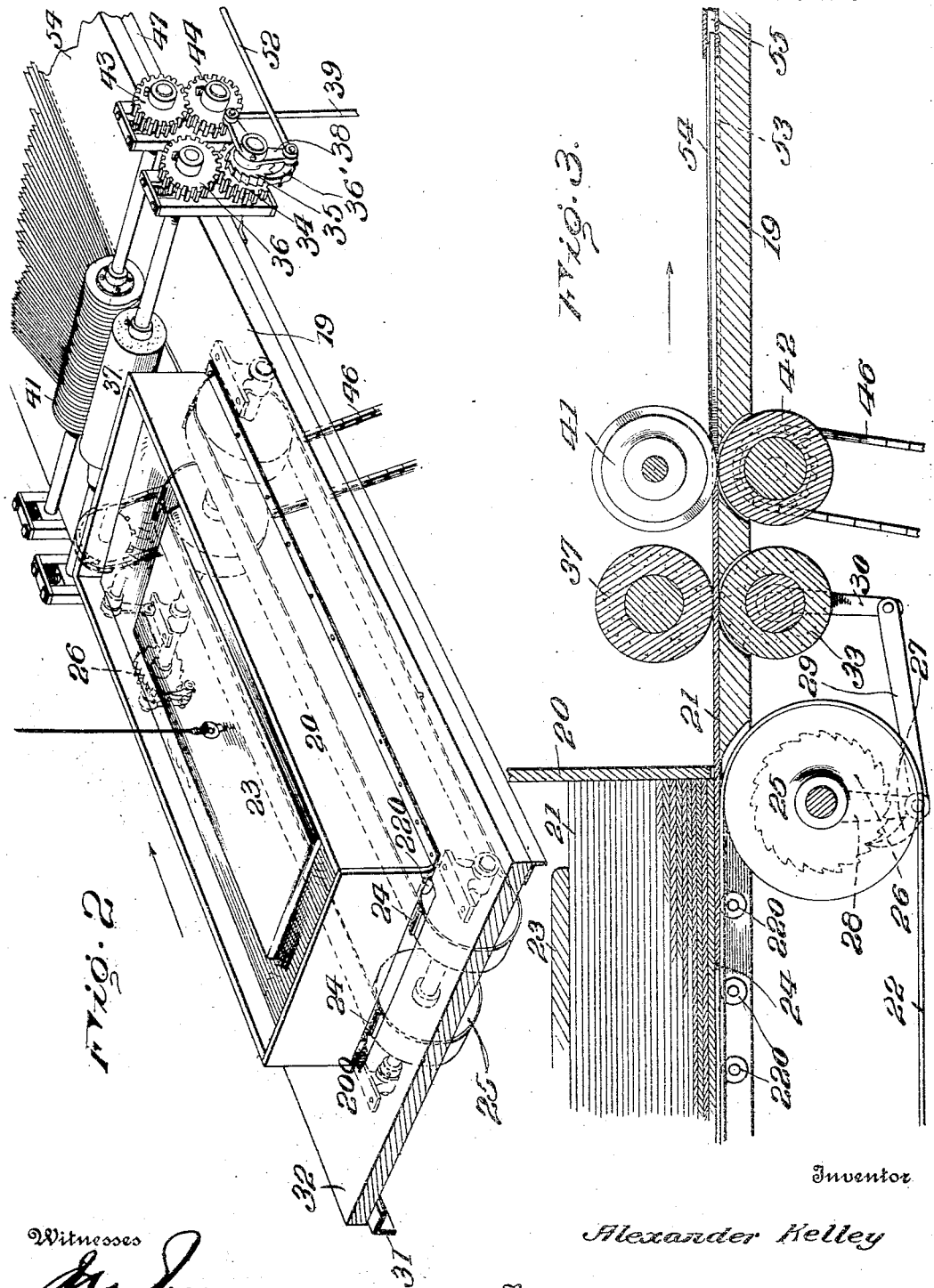

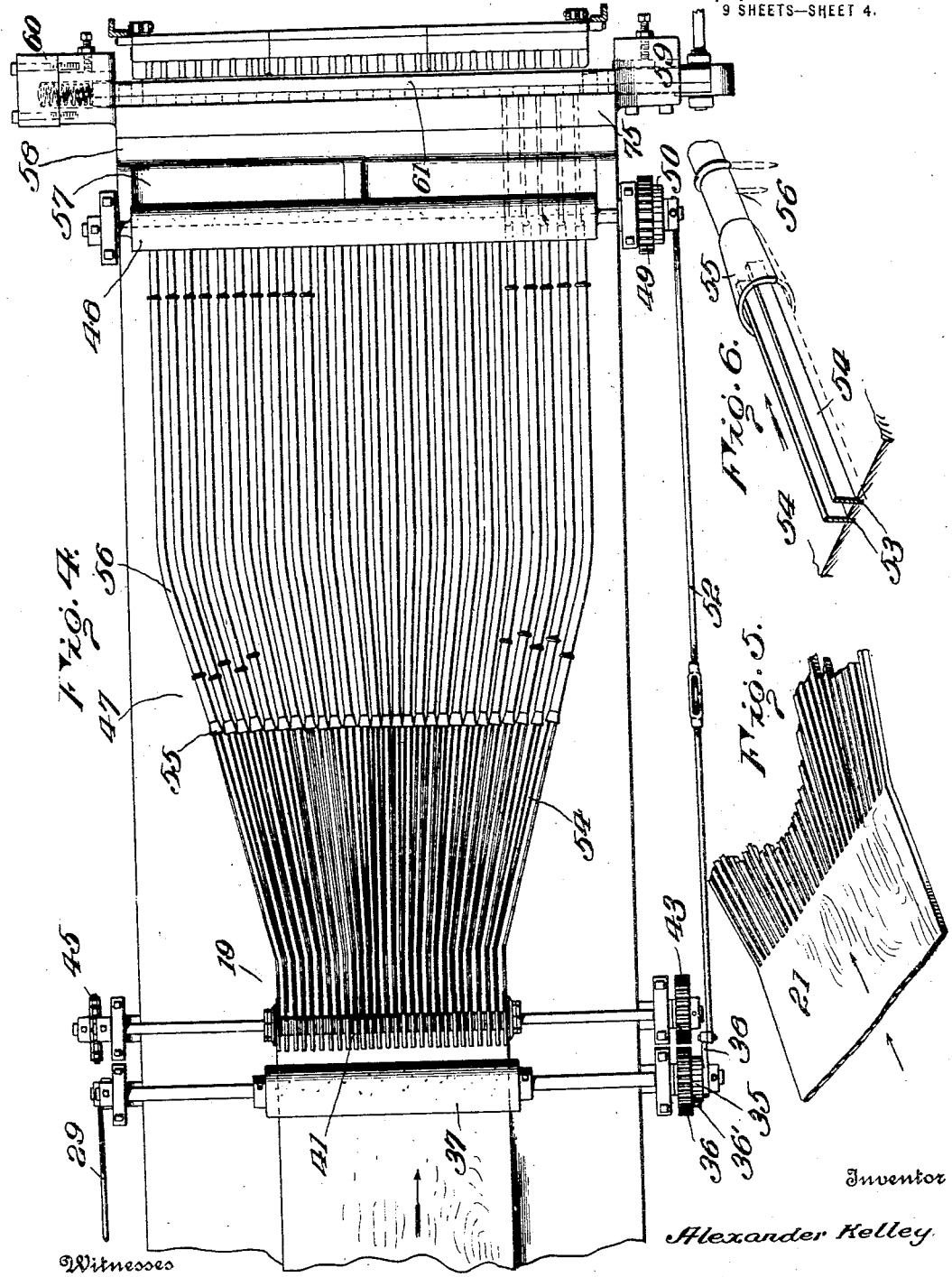

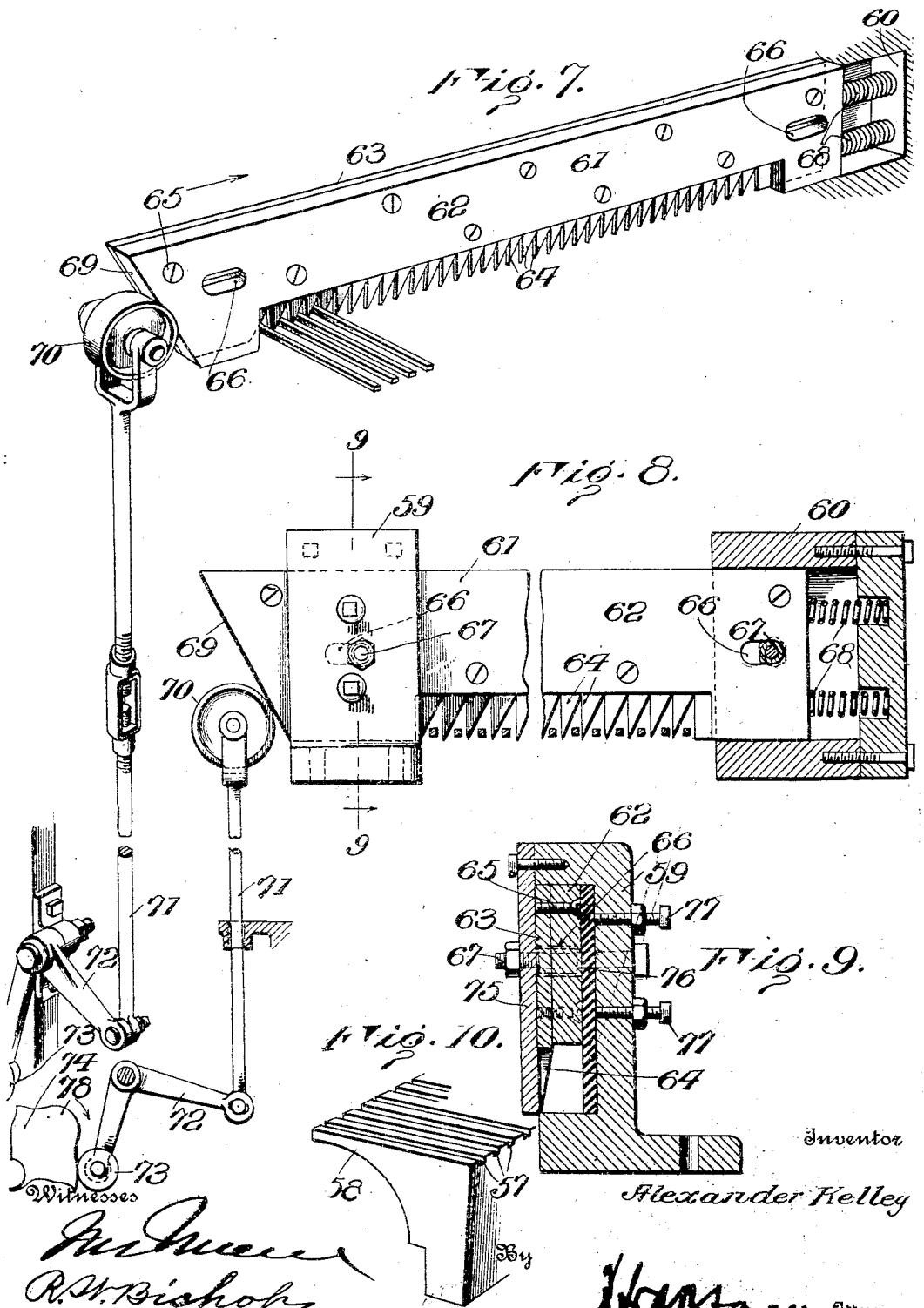

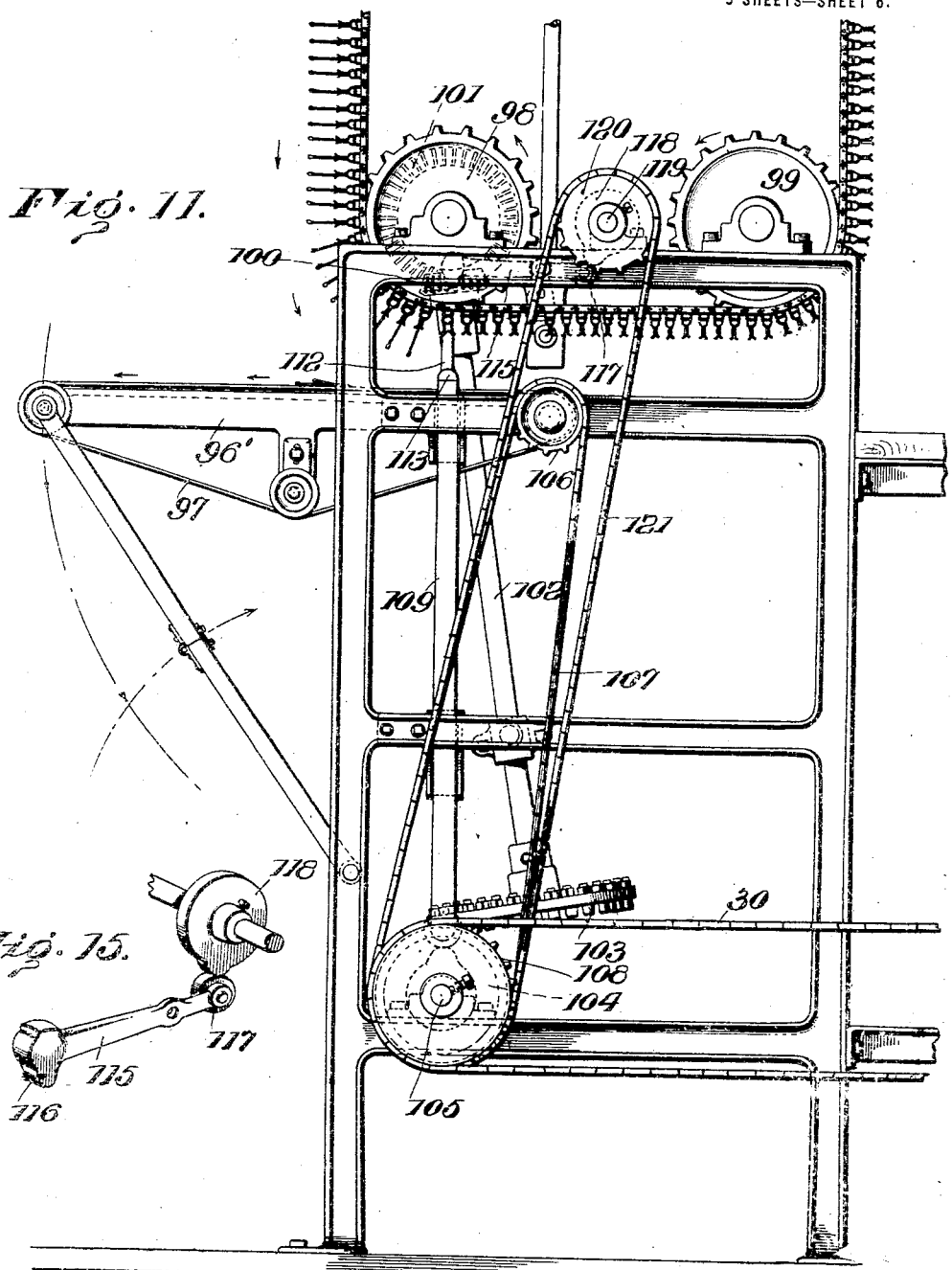

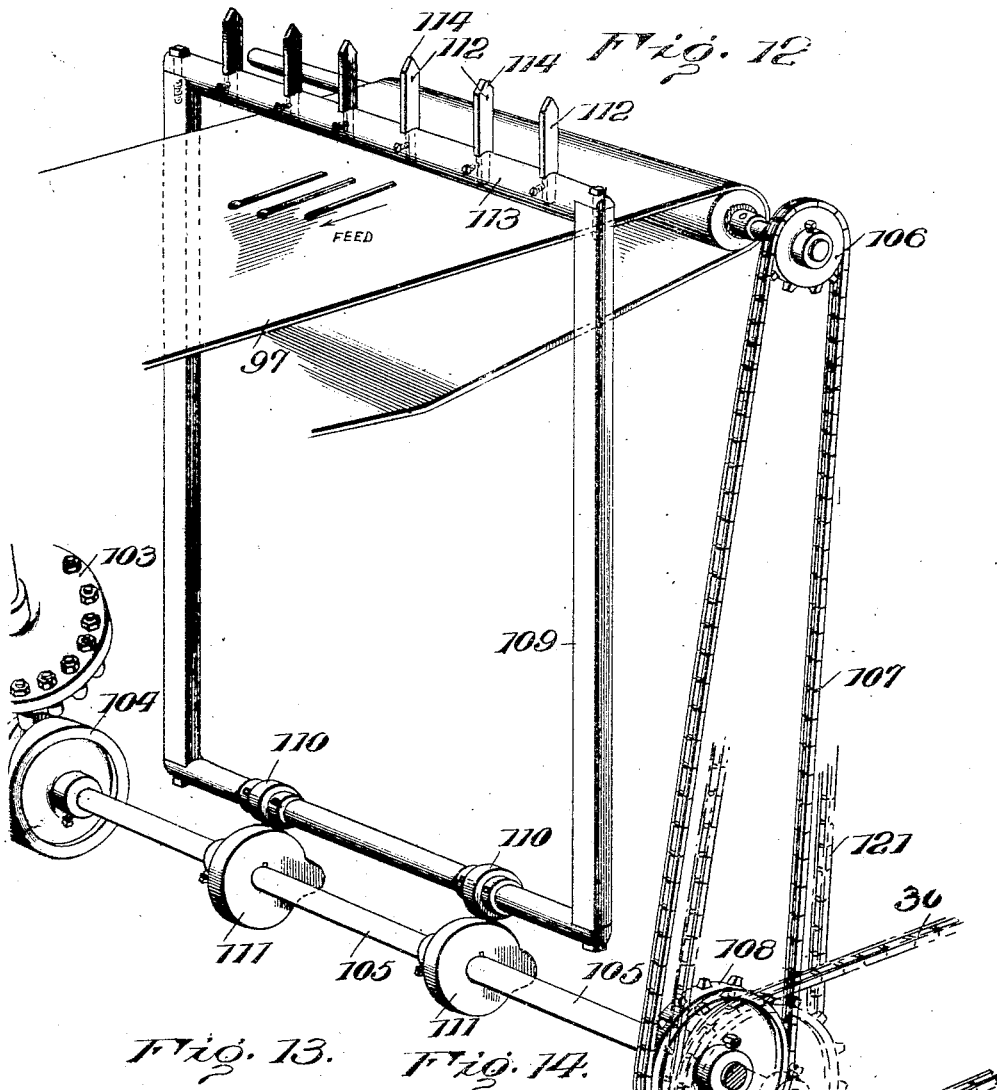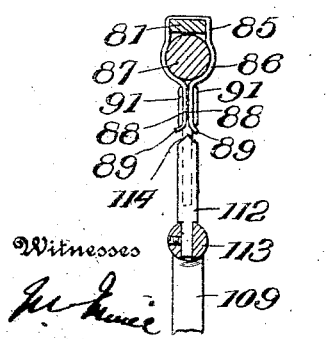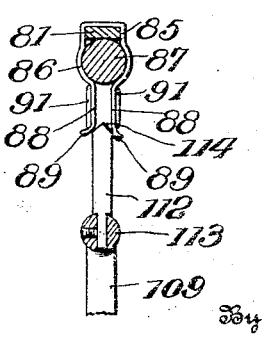

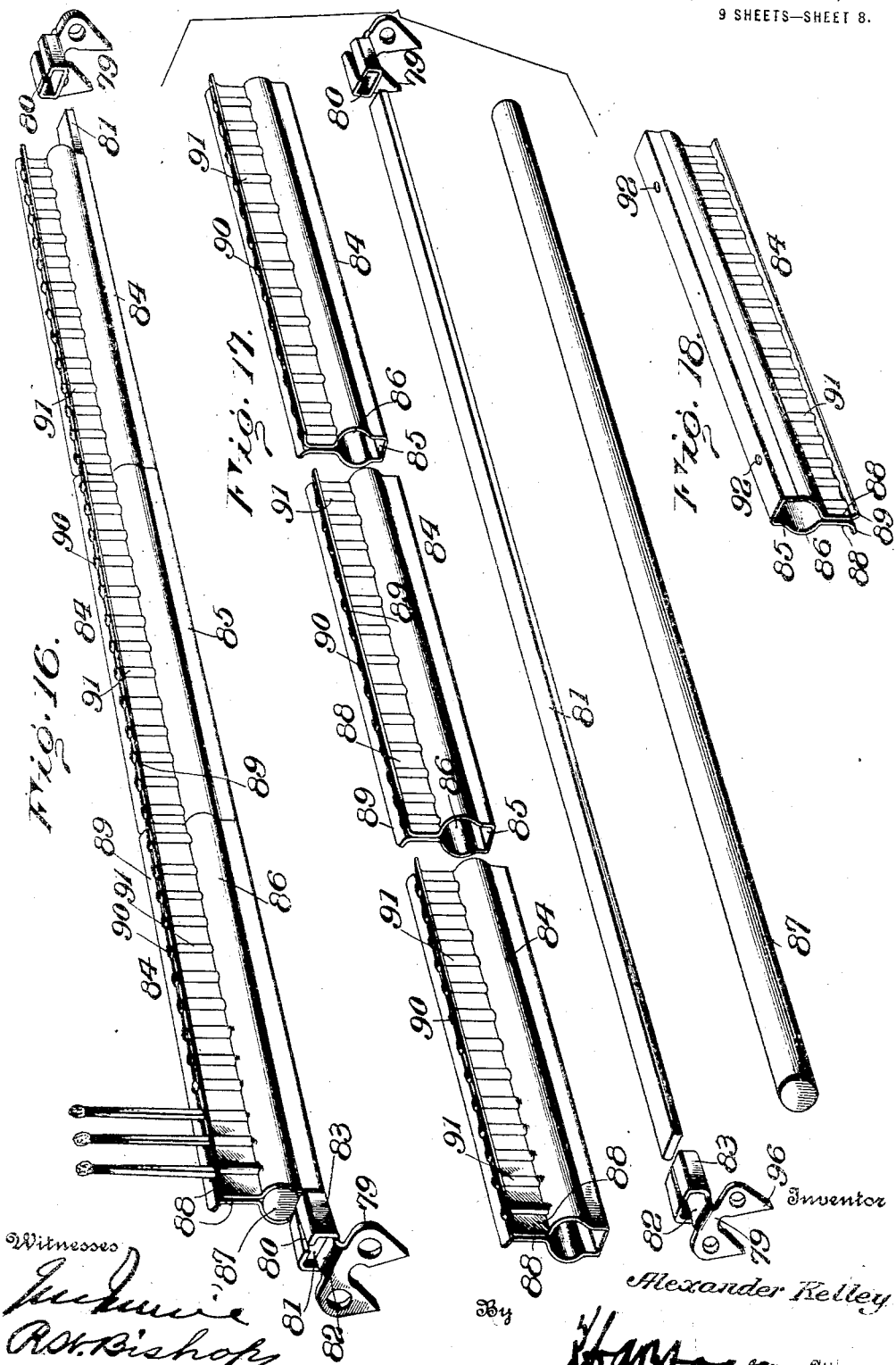

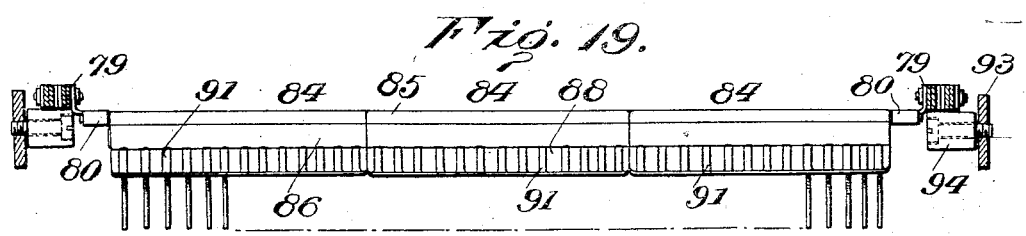
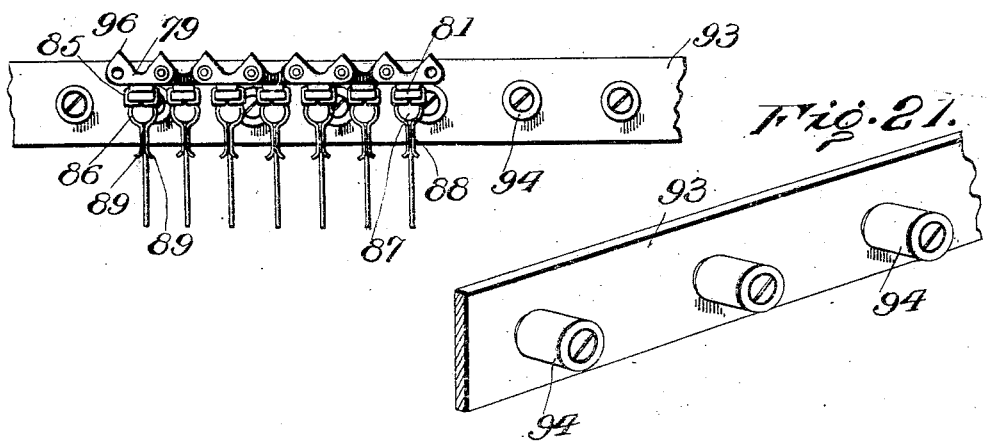
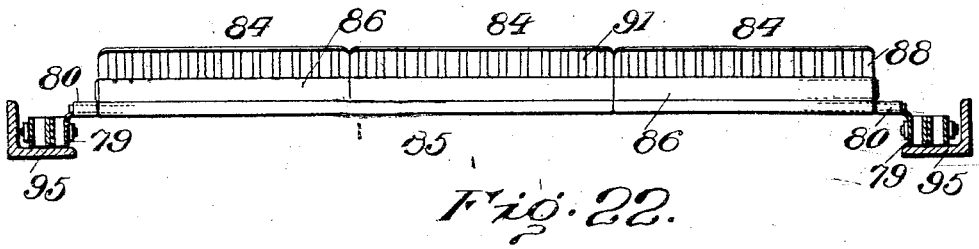

ALEXANDER KELLEY, OF WILMINGTON, DELAWARE, ASSIGNOR TO CLIMAX MACHINE COMPANY, OF WILMINGTON, DELAWARE, A CORPORATION OF DELAWARE.

MATCH-MAKING MACHINERY.

1,168,310.  Specification of Letters Patent.  Patented Jan. 18, 1916.

Application filed September 18, 1914. Serial No. 862,366.

*To all whom it may concern:*

Be it known that I, ALEXANDER KELLEY, citizen of the United States, residing at Wilmington, in the county of New Castle and State of Delaware, have invented certain new and useful Improvements in Match-Making Machinery, of which the following is a specification.

My invention relates to match-making machinery and seeks primarily to produce an apparatus whereby either round or square matches may be produced, as occasion may demand.

A further object of the invention is to provide a conveyer of such construction that it will retain either round or square match splints without any change in the construction of the conveyer.

Other objects of the invention are to provide novel means for discharging the finished matches from the conveyer.

Incidental to the several stated objects of the invention my improvements involve novel structural features which combine to produce an apparatus of large productive capacity combined with economy of space and reduced liability to fire loss.

The several objects of my invention are attained in an apparatus of the character illustrated in the accompanying drawings which illustrate what I now consider the best embodiment of the invention.

The particular construction and arrangement of the several parts of my machine are hereinafter described in detail and the novel features of the same are then particularly pointed out in the claims following the description.

In the accompanying drawings:—Figures 1 and 1ᵃ together, represent a side elevation of a complete apparatus embodying my improvements. Fig. 2 is an enlarged perspective view of the mechanism for feeding stock or veneer sheets to the initial cutters whereby the said stock or sheet is subdivided into splints. Fig. 3 is an enlarged longitudinal vertical section of the same. Fig. 4 is an enlarged plan view of the table to which the stock or sheet is fed and upon which the splints are separated before being delivered to the conveyer. Fig. 5 is a detail perspective view of a portion of a partly cut-up sheet of veneer stock. Fig. 6 is a detail perspective view of a portion of the guides by which the separated splints are directed to the conveyer. Fig. 7 is a detail perspective view of the cutter whereby the splints are divided into match lengths. Fig. 8 is an enlarged detail sectional elevation of the same mechanism. Fig. 9 is a detail vertical section on the line 9—9 of Fig. 8. Fig. 10 is a detail perspective view of a grooved plate which is interposed between the conveyer and the table shown in Fig. 4. Fig. 11 is an elevation of the discharging mechanism. Fig. 12 is a detail perspective view of the yoke which acts to release the finished matches from the conveyer. Figs. 13 and 14 are detail sectional views showing the operation of this yoke in engaging the conveyer and releasing the matches therefrom. Fig. 15 is a detail perspective view of an additional device for discharging the matches from the conveyer. Fig. 16 is a detail perspective view of one member of the conveyer. Fig. 17 is a group of perspective views showing the constituent elements of the said member of said conveyer separated and approximately in their proper relative positions. Fig. 18 is a detail perspective view of one section of the match-engaging member showing the same inverted relative to the position illustrated in Figs. 16 and 17. Fig. 19 is a cross sectional view of a portion of the conveyer and the track upon which the same is supported. Fig. 20 is a detail elevation of a portion of said track or support for the conveyer. Fig. 21 is a detail perspective view of the conveyer support. Fig. 22 is a view similar to Fig. 19 but showing the conveyer relatively inverted.

Referring first to Figs. 1 and 1ᵃ, a machine for forming round match splints is indicated at 1, the said machine being of any well-known or preferred detail construction and including in its structure means for inserting the splints into the conveyer indicated at 2. A drum or roller 3 is arranged above the said machine and receives the thrust by which the splints are inserted into the conveyer. A second drum or feed-roller 4 is arranged above the machine, at the front side of the same, and this roller is driven by bevel gearing, indicated at 5, receiving motion from a shaft 6 mounted in suitable brackets upon the frame of the machine and actuated by a crown-gear 7 having its lower end engaging a cam roller 8 on the main power shaft 9. The conveyer 2 extends over a tortuous path around a multiplicity of supporting and driving rollers which are supported upon posts 10 or any other convenient frame possessing the requisite strength, the said conveyer being of sufficient length to permit the splints to be dipped and thoroughly dried before they are discharged, as is usual and will be readily understood. After leaving the machine, indicated at 1, the conveyer carries the splints over a heating table 11 and dips them slightly in a tank 12 containing paraffin or a similar coating composition, after which the splints are carried to one or more tanks 13 and 14 containing a composition for forming the match heads. The splints are dipped in the compositions in the usual manner and a lever or operating rod 15 is provided and connected with the rollers supporting the conveyer adjacent the tanks so that, when so desired, the conveyer may be shifted to carry the splints free of the tanks and thereby permit the splints to be dipped only once, or more frequently, as may be required by the particular style of match being made. In the course of its travel the conveyer eventually reaches a discharging mechanism, shown at 16, and by the action of this discharging mechanism the treated splints are released from the conveyer as finished matches and may then be carried to machines for boxing them or may be made into packages by hand. After leaving the discharging mechanism the conveyer is carried up and over guide pulleys 17 and 18 and from the last named guide pulley it passes to the feeding drum or roller 4, as shown.

Upon reference to Fig. 1, it will be noted that the conveyer passes around rollers 150 and 151 supported on arms 152 projecting from rock shafts which are mounted on the sides of the tanks. These shafts are provided with crank arms 153 connected by a rod 154 and the lower rock shaft is provided with an additional crank arm or lever 155 to which the end of the rod 15 is pivoted. The rod 15 will, of course, be long enough to extend within convenient reach of the operator and it will be readily understood that a pull on the rod will swing the arms 152 so as to lift the conveyer above the tanks. If it be desired to dip the splints once, the link or rod 154 is disconnected at its lower end so that manipulation of the rod 15 will then lift the conveyer above the lower tank but permit dipping in the upper tank. It will also be noted that the conveyer passes around guide rollers on a pivoted frame 156 over the tank 12. The free end of this frame is suspended by a link 157 from a lever 158 which is pivoted to the supporting structure and is provided with an arm 159 rising to the operating rod 15 and adapted to be engaged by tappets 160 on said rod. When the rod is moved in one direction, one tappet will engage the arm 159 and move the same so that the conveyer will be lifted and the splints will clear the tank. On movement of the rod in the opposite direction, the other tappet will engage the arm 159 and the conveyer will be lowered to dip the splints.

Between the discharging mechanism and the splint-forming machine 1, I arrange a feeding table 19 upon which is shown a hopper 20 of proper dimensions to maintain sheets of veneer, indicated at 21, in proper position to be engaged by the feed belt or apron 22. A weight 23 is preferably placed upon the pile of veneer sheets so as to serve as a follower and hold them against buckling so that they will be successively and positively engaged by the lugs or feed bars 24 on the apron 22. While the particular detailed construction of the hopper 20 may be varied, I prefer to construct it, as shown most clearly in Fig. 2, in the form of an open-top box, the front and rear ends of which terminate slightly above the feed-table so as to provide a slot of such a height that just one sheet of veneer may pass therethrough and the lugs or feed bars 24 are of corresponding height so that they will positively engage the end of the said sheet and force it positively from the hopper to the feeding and cutting rolls. The lugs 24 are spaced apart a distance equal to the length of the veneer sheets so that as one lug leaves a sheet, the succeeding lug will engage the end edge of the next sheet of veneer.

The feeding apron is mounted upon drums or rollers 25 which are supported in suitable bearings upon the feed-table and the shaft of one of the said drums or rollers is equipped at one end with a ratchet wheel 26, which is engaged by a pawl 27 carried by an arm 28 loosely hung on the shaft. The arm 28 is connected by a link 29 with a crank arm 30 on the shaft of a feed roller 33 whereby the apron will be actuated with a step by step movement as will presently appear. I prefer to use two feed aprons which run over rollers 220 which are mounted in any convenient manner on the feed table and sustain the weight of the stock. The particular form of the feed-table is, of course, subject to variation in its details but I prefer to construct the sides of the same of angle iron, as shown at 31, and secure upon the said sides, plates 32 which will aid in maintaining the rigidity of the frame and will be so arranged as to leave proper openings for engagement of the stock by the feeding apron. At the discharge end of the hopper the top of the table is smooth for a short distance but is recessed upon its under side to accommodate the lower feed roller 33. The shaft of this feed roller 33 is extended laterally beyond the table and is equipped, at the end opposite the crank arm 30, with a gear wheel 34 and also equipped with a ratchet wheel 35. The gear wheel 34 meshes with a similar gear 36 on the end of the shaft of the upper feed roller 37 while the ratchet wheel 35 is engaged by a pawl 36' carried by an angle lever 38 which is fulcrumed loosely at its bend or angle upon the end of the shaft carrying the lower feed roller. To the upper horizontally extending arm of said angle lever I pivot a connecting rod or link 39, the lower end of which engages an eccentric 40 driven by the shaft 9 through suitable gearing including a belt 300. It will thus be readily seen that while the upper feed roller is positively actuated through the lower feed roller and will rotate simultaneously therewith, the movement of these feed rollers is not continuous but is intermittent or step by step and a like movement is imparted to the feeding apron so that the sheet of veneer will be fed to the slitting knives and the cutting mechanism at such intervals and through such a distance as will be necessary to produce splints of the desired length and feed them positively into all of the successive sections or members of the conveyer. Immediately adjacent the feeding rollers 33 and 37 and between the same and the conveyer I provide the upper and lower slitting knives or rollers 41 and 42. The lower slitting roller or knife extends up through slots in the table and the edges of these knives slightly overlap so that the sheet of veneer will be cut entirely through. These slitting rollers, as will be readily understood, consist of central shafts having rigidly secured thereon a plurality of disks arranged close together and having their peripheral edges sharpened so as to cut through the stock. The shafts of both knives or cutting rollers are extended beyond one side of the table and are equipped with intermeshing gears 43 and 44 so that the knives will be positively and simultaneously rotated in opposite directions to cut through the stock, and the shaft of the lower knife is extended beyond both sides of the table and is equipped with a sprocket wheel 45 around which is trained a sprocket chain 46, said chain 46 also passing around a sprocket wheel on the shaft which carries the cam 40 so that a continuous rotation is imparted to the knives. A second set of feed rollers 48 is provided at the discharge end of the table. These feed rollers have their shafts extended and equipped with intermeshing gears 49 so that they will be positively and simultaneously rotated to feed the separated splints, and the lower feed roller 48 is also equipped with a ratchet wheel 50 engaged by a pawl carried by a depending lug or arm 51 which is suitably mounted upon the bearing or support for the feed roller and to which is pivoted a link 52 extending to and pivoted to the pendent arm of angle lever 38. I thus provide for the proper simultaneous step by step movement of both pairs of said rollers so that there will be no pulling nor buckling of the separated splints due to possible differences in the speed of the different feed rollers.

As before stated, and shown most clearly in Fig. 3, the top of the feed table is smooth between the hopper and the feed rollers 33 and 37 but just beyond the knives 41 and 42 the top of the table has grooves 53 formed therein. These grooves extend parallel and longitudinally of the table for a short distance and then diverge as shown clearly in Fig. 4 and in said grooves I insert edgewise vertically disposed guide strips or rails 54 whereby chutes or troughs are formed which receive the splints cut by the knives 41 and 42 and guide the same over the table. As shown in Fig. 5, the sheet of veneer is cut into a number of very narrow strips, each strip being of the thickness desired for the match splint. As the strips emerge from the knives they will pass between the rails 54 and will be thereby diverted laterally so as to be positively separated, and in the further travel of the stock the strips will be entirely independent and not connected in a sheet in any way. The ends of the rails 54 enter the mouths or flared extremities 55 of tubes 56 which are secured in any convenient manner upon the feed-table and terminate immediately adjacent and in alinement with grooves 57 formed in the top of a plate 58 which is secured to the frame of the machine 1 and bridges the space between the feed table 19 and the conveyer. At the ends of this guide plate 58 I secure to the frame of the machine 1 or to any other fixed support, brackets or guides 59 and 60 which receive and support the ends of a reciprocating cutter 61 by the operation of which the several strips supported by the grooved plate 58 are severed into splints of the desired length. This reciprocating cutter consists of a bar or head block 62 and a cutting plate 63 secured to one side of the same; the said plate 63 having its lower edge formed into a series of teeth 64 projecting below the edge of the head block 62, as clearly shown in Figs. 7, 8 and 9. The block 62 and the cutting plate 63 are secured together by screws 65 inserted through them and they are provided with longitudinal slots 66 which are engaged by pins 67 provided on the brackets 59 and 60 whereby the cutter is guided and its movement limited. Between the end of the bracket or housing 60 and the adjacent end of the cutter I provide springs 68 which tend to project the cutter and the opposite end of the cutter is beveled, as shown at 69, to be engaged by a roller 70 at the upper end of an operating rod 71 supported vertically in any convenient manner. The lower end of this operating rod 71 is pivoted to one arm of an angle lever 72, the opposite end of which is equipped with a roller 73 riding upon a cam 74 which is actuated through suitable gearing from the main driving shaft 9, as will be readily understood. A guard plate 75 is secured upon the front side of the brackets 59 and 60 so as to prevent injury to the operator by this cutter and within each supporting bracket we provide a wear plate 76 which fits between the rear wall of the bracket and the rear side of the head 62 and is adjustable toward the said head by means of screws 77, as clearly shown in Fig. 9, whereby wear upon the cutter may be taken up.

It will be readily understood that as the cam 74 rotates, the projection 78 thereon rides against the roller 73 and vibrates the angle lever 72 so as to impart a lift to the rod 71 which carries the roller 70 at the upper end thereof against the bevel face 69 of the cutter and thereby forces the cutter in against the spring 68. The splints are thereby severed horizontally and as they are at this time supported by the grooved plate 58 and the conveyer, breakage or splitting of the splints is minimized. The springs 68 hold the beveled or inclined face 69 of the cutter constantly in contact with the roller 70 and by their expansion move the cutter outward as the lifting rod 79 is lowered, and the strength of the springs, acting with the weight of the said rod, should be sufficient to effectually return the cutter to its initial position from which it is driven by the lifting rod under the influence of the cam 74 and the angle lever 72. The several parts thus far described are so timed that the reciprocating cutter 61 acts in the period of rest between two intervals of the feeding of stock to the conveyer, and the stock is fed step by step in the intervals between the successive actions of said reciprocating cutter. The stock is fed in such manner that when one sheet of veneer leaves the hopper the next sheet will immediately commence to move and the end of this second sheet will abut the adjacent end of the first sheet so that there will be a constant supply of material to the reciprocating cutter and the conveyer. The feed rollers will exert sufficient pressure on the stock to force it from the grooved plate 58 into the conveyer where it will be held momentarily while the horizontal cutter severs the same into splints and the conveyer will then be fed forward a sufficient distance to bring the next section into alinement with the grooves of the plate 58 so that a second series of splints will be fed into the conveyer and severed from the stock. The parts are so arranged and timed in their operation that the section of the conveyer to be filled will be brought into the plane of a radius of the feeding drum 4 and in alinement with the grooves of the plate 58 at the proper instant to receive the ends of the strips fed toward the conveyer by the feeding rollers. The feeding drum or roller 4 thus not only serves to actuate the conveyer but also receives the thrust of the stock so that the section of the conveyer to be filled will not yield under the movement of the stock but will positively engage and hold the same.

While I have shown the feeding table arranged horizontally it will be understood that this particular arrangement is not necessary and may be varied according to the exigencies of any particular circumstance.

The conveyer in my present machine is composed of a series of pivotally connected links which are arranged in pairs, the separate corresponding members of the pairs running upon guides or tracks at the opposite sides of the apparatus, and conveyer sections extending between and carried by the members of the said pairs of links. I prefer to employ a chain consisting of a plurality of links arranged side by side in each section as shown most clearly in Figs. 19 and 22, and upon the inner members 79 of the said links I provide boxes 80 which receive the ends of the carrier bars 81 constituting the base members of the conveyer sections. As shown clearly in Figs. 16 and 17 these boxes 80 may be conveniently formed by providing a lateral tongue 82 upon the link member 79 which tongue is provided with wings or extensions 83, the said wings or extensions 83 being folded up and inwardly over the tongue 82 so as to provide an angular box or holder in which the end of the base bar 81 may be readily inserted.

The conveyer members are preferably constructed each in three similar sections 84, each section comprising an angular base portion 85 adapted to fit closely around the base bar 81 and a circular portion 86 above the said base portion 85, the said circular portion being formed by extending and expanding the side members of the base 85 so that the said circular portion may fit closely around an alinement or abutment rod 87. The said rod is cylindrical, as clearly shown in Fig. 17, and is shorter than the base bar 81 so that the projecting ends of the said base bar may engage the boxes or holders 80 without any interference from the abutment rod. Above the circular portion 86 the conveyer members are brought close together to form coacting jaws 88 which lie against each other adjacent their free longitudinal edges or have said edges at least as close together as their inner edges so that, when splints are inserted, the jaws will be parallel and lie flat against the splints to firmly hold them irrespective of their size or shape. The longitudinal free edges of the sections are flared, as shown at 89, so as to facilitate the entrance of a match splint between the jaws and to guide the said splints into the grooves 90 formed in the inner faces of the jaws or flat abutting portions 88 of the sections. As the sections will preferably be formed of sheet metal, these grooves may be provided by fluting the jaws as indicated at 91. The grooves 90 in the opposed faces of the jaws will register with each other and will also be so located as to register with the ends of the grooves 57 in the plate 58 so that as the strips of stock issue from the said plate they will pass into the grooves 90 and will be firmly gripped by the jaws 88. After the splints have been severed the conveyer is set in motion so that the splints will be carried through the paraffin and coating composition and subsequently dried in the usual manner so as to form the matches. The rod 87 serves as a brace to reinforce and support the expanded portions 86 of the carrier sections and also provides a fulcrum upon which said portions and the jaws 88 may swing or resiliently bend in the act of opening or closing. It also receives the thrust of the entering splint or strip and thereby prevents the strip being forced too far into the carrier from any cause.

It is to be noted that the sections of my conveyer will receive and hold round match splints as well as square splints without involving any changes in the construction. Inasmuch as the jaws are held toward each other by the resiliency of the sections and are flat so that they come into intimate contact, as shown in Figs. 16 and 17, they will firmly grip and hold the splints whether they be round or square, and inasmuch as the splints are positively clamped by the conveyer members the operator may produce either style of splint or match as may be required without being under the necessity of establishing two complete plants. When it is desired to produce square splints the improved feeding and cutting mechanism herein described and shown is operated while the machine for forming round splints is permitted to remain at rest. When it is desired to produce round matches it is necessary for the operator merely to place the stock in the machine 1 and shift the actuating gearing so that the machine 1 will be set in operation. Openings 92 are provided in the base portions of the sections 84 so that if desired, fastening screws may be inserted therethrough into the base bars 81 and thereby rigidly secure the sections to the base or carrier bars. Ordinarily, however, the provisions of the alinement bar or rod 87 above or at the outer side of the base or carrier bar will serve to prevent the sections of the conveyer member slipping out of place so that the use of the fastening screws is not absolutely necessary. It is to be noted that the members of the conveyer are formed in three sections so that short dies may be employed in manufacturing the sections, and, also, should a section become broken, it will not be necessary to provide an entirely new cross member to the conveyer but the particular section which has been damaged may be removed without renewing the remaining two sections upon the same base or carrier bar and alinement bar or rod. The base or carrier bars, being inserted in the boxes 80 and fitting snugly therein, will be held against movement laterally of the conveyer while at the same time they may be readily disengaged from the conveyer should any repairs be necessary.

It will be noted that the splint-engaging members are open-ended and are preferably held on the base bar by frictional engagement only. It is, therefore, not necessary to stop the machine to permit repairing of the conveyer as a tap from a convenient tool upon the base bar will drive it from the box on the chain and the splint-engaging members may then be slipped from the base bar and the abutment bar.

Inasmuch as the conveyer is of metal and is necessarily very long in order that the matches may be thoroughly dried before being discharged, it is advisable to provide some form of track or support between the several guide rollers over which the conveyer travels.

In my machine I employ bars 93 which extend between adjacent posts of the supporting structure and upon the inner faces of these bars I mount rollers 94 upon which the smooth or straight edges of the chain links may ride when the jaws 88 of the conveyer members are in a downturned position, as shown in Figs. 19 and 20. These rollers will be preferably spaced apart a distance not exceeding the length of two adjacent links so that they will firmly support the chain without undue friction. When the conveyer reaches a portion of its run, in which the jaws are upturned, as shown in Fig. 22, I provide angle bars 95 having their horizontal flanges inturned to project under the links and form tracks upon which the projecting points 96 of the links may slide. The weight of the conveyer and the splints or matches carried thereby will thus be properly supported and the conveyer guided through the path marked out for the same.

The travel of the conveyer eventually brings the treated splints or matches to the discharge mechanism indicated generally by the reference numeral 16 in Fig. 1ª. This discharging mechanism comprises a suitable supporting frame on which is secured a table 96′ over which a belt or apron 97 travels, the said belt or apron being disposed below the main conveyer and arranged to receive the matches therefrom as they are discharged. The conveyer may deposit the matches in a convenient receptacle or may be extended so as to feed them into a boxing machine. The main conveyer passes under guide rollers 98 and 99 which are mounted in suitable bearings upon the supporting frame and which cause the conveyer to travel in a substantially horizontal path parallel with the apron 97. The guide roller 98 is actuated through a pinion 100 engaging the crown gear 101 upon the end of the feed roller, and carried by the upper end of a shaft 102 which is equipped at its lower end with a crown gear 103 operatively engaging a cam 104 carried by a shaft 105 which is driven by the belt or chain 300 actuated from the shaft 9. By reason of the described gearing the guide roller 98 is given an intermittent or step by step movement corresponding to the movement of the conveyer which is imparted to the same by the feed roller 4. The apron or belt 97 is, of course, supported by suitable rollers in the ends of the table 96' and upon the shaft of one of these rollers is secured a sprocket wheel 106 around which is trained a sprocket chain 107 which also passes around a sprocket wheel 108 on the shaft 105, whereby the said apron 97, is continuously operated. Slidably mounted in suitable guides on the supporting frame is a yoke or vertically movable frame 109 which is provided at its lower end with rollers or bearing surfaces 110 engaging cams 111 secured rigidly upon the shaft 105. The action of the said cams obviously, will be to impart a vertical intermittent reciprocating motion to the yoke 109 as the shaft rotates and the said yoke carries at its upper end spreaders 112 which are adapted to engage between the jaws 88 of the conveyer members and thereby separate the said jaws so that the matches engaged and held by them will be released and be permitted to drop onto the apron 97. These spreaders consist of plungers or plates carried by a cross bar 113 at the upper end of the yoke, and the upper ends of the spreaders are pointed or tapered as shown at 114 whereby they may readily engage the flared edges of the jaws 88 and enter between and separate the jaws. This action is clearly illustrated in Figs. 13 and 14 of the drawings. The number of spreaders may be varied to suit the desires of the operator but I prefer to employ two spreaders for each section of a conveyer member, the spreaders engaging the jaws of the said sections adjacent the ends thereof and between the splints so that the jaws may be positively separated with a small number of spreaders. It will be noted that the spreaders act directly on the same members which hold the splints and operate between the ends of the jaws so that the jaws will be positively opened and the splints released. The spreading of the jaws in the manner described and illustrated in Figs. 13 and 14 will generally be sufficient to release the match splints so that they will fall upon the apron 97, but sometimes the splints will tend to adhere to the jaws under the action of the heating and drying mediums and in order to overcome this tendency and provide for a positive and thorough discharge of all the matches I employ a supplemental discharging device in the form of a hammer or tappet 115 which is pivoted between its ends to the supporting structure and is provided at one end with a head 116 adapted to strike or tap upon a rim provided for that purpose on the end of the feeding roller 98, the opposite end of the tappet carrying a roller 117 which rides upon a cam 118 carried by a shaft 119 mounted upon the supporting structure between the rollers 98 and 99 and equipped with a sprocket wheel 120 connected by a chain 121 with a sprocket wheel upon the shaft 105.

The action of the cam is so timed that the projection thereon will lift the head 116 at intervals and after the cam projection clears the hammer the said head will fall upon the drum immediately over a conveyer section and impart a jarring blow thereto which will eject the matches from the conveyer. As the conveyer is endless, the members of the same which have been freed of the matches will be carried to the feeding drum or roller 4 and there receive a fresh supply of the splints which will be carried through the several dipping and drying operations and finally discharged, as will be readily understood, the operation of the apparatus being continuous and the cycle being repeated until all of the stock has been used or the demand for the product of the machine has been met.

It will be readily noted from the foregoing description, taken in connection with the accompanying drawings, that I have provided an apparatus in which either round or square splints or matches may be produced without requiring any reorganization or reconstruction of the plant and an operator will thus be enabled to meet the demand for either round or square matches without being under the necessity of installing two complete plants and without having a large capital rendered idle at any time owing to the slack demand for one style of matches. The stock is fed to the first feed rollers and engaged by them so as to pass over the feed table with a step by step motion and during each period of travel will move a distance corresponding to the length of the match to be produced.

The rotating slitting knives separate the stock, as hereinbefore stated, into a large number of fine strips and these strips at once enter the guides on the upper side of the table and are positively separated as they move to the conveyer. Emerging from the second feed rollers these strips are forced into a waiting member of the conveyer and then at once separated into splints of the desired length. Should there be a demand for a longer or a shorter match than that for which the machine has been arranged the reciprocating cutter may be moved relatively from or toward the conveyer and the grooved plate 58 removed and one of a different length substituted therefor. The adjustment of the reciprocating cutter may be effected in any convenient or desired manner and various ways of accomplishing this result will readily suggest themselves to the skilled mechanic. I have preferred in practice, to mount the housings, which support the end of the cutter on slides which may be moved by adjusting screws or worms. Inasmuch as the strips of the stock are positively separated before they reach the conveyer, they will be spaced apart so as to readily engage the grooves in the jaws on the conveyer and will thereby be positively and quickly clamped by said jaws.

It is to be noted that the guard plate 75, which is arranged in advance of the reciprocating cutter, extends entirely across the feed table and bears on the plate 58 so that the splints are positively held at the point where they enter the conveyer and consequently will be effectually prevented from splitting or breaking when acted upon by the said cutter. The cutter has a shearing action upon the splints and as it moves very quickly will make a clean sharp cut without tending to break the splint. I further guard against breakage of the splint by providing the cutter with teeth corresponding in number with the number of splints being acted upon so that each tooth acts upon one splint or strip and the cutting operation is quickly accomplished without any loss of material. The cutter may be made in sections if preferred and such construction will reduce the cost of up-keep of the machine. The angular box on the conveyer chain engaging an angular base bar effectually prevents the several conveyers from moving about their respective points of connection with the chain so that the members of the conveyer will come to rest in proper position to receive the splints and to discharge the finished matches and will hold the splints in proper position to be headed, dipped or dried during the travel of the conveyer. Furthermore, as the members of the conveyer are thus held against rotation about their several points of connection with the conveyer chains, contact of the match heads during the process of drying is prevented so that adjacent matches will not be liable to stick together and the loss now frequently due to this cause will be avoided.

It is to be understood that I do not limit myself to the precise details of construction herein described and shown as many minor changes may be made therein without departing from the spirit or scope of the invention as the same is defined in the following claims.

Having thus described the invention, what is claimed as new is:—

1. In match-making machinery, the combination with splint-forming means, of a conveyer moving past said splint-forming means and comprising transverse members, each of said members comprising an elastic strip so bent that substantial longitudinal flat portions adjacent their edges are brought toward each other more closely at the outer portions and normally bear against each other and are grooved to provide splint-receiving channels, the bend being such and so spaced from said flat portions that, when the splints are forced into the grooves and the flat portions thereby slightly spaced said flat portions will be substantially parallel, and means for driving splints between the said jaws.

2. In match-making machinery, the combination with splint forming means, of a conveyer moving past said splint forming means and adapted to receive splints therefrom and comprising separate endless chains, carrier bars connecting said chains, and a pair of coacting splint-engaging jaws fitted around and carried by each of said carrier bars.

3. The combination of chain links having inwardly projecting boxes thereon, carrier bars fitting frictionally in and extending between corresponding boxes, and splint-engaging jaws fitted upon said carrier bars.

4. The combination of chain links having angular open ended boxes projecting inwardly therefrom, angular carrier bars having their ends fitted in and held by said boxes, and a splint holding member embracing said bar and having opposed coacting resilient jaws.

5. A conveyer for match splints comprising a carrier bar, a rod disposed above the carrier bar, and a splint engaging member embracing the carrier bar and the rod and terminating in opposed jaws beyond the said rod.

6. A conveyer for match splints comprising a carrier bar, a splint holding member having a base portion fitted to the said carrier bar and expanded laterally above the same and terminating above said expanded portion in resilient opposed splint-engaging jaws, and a rod extending through the expanded portion of the member above the carrier bar.

7. A conveyer for match splints comprising a series of carrier bars, a series of rods disposed above the respective carrier bars, and splint-holding members each consisting of a base portion having angular engagement with a carrier bar, an expanded portion fitting around the rod above said bar, and opposed jaws extending from said expanded portion and having flared terminal edges and provided with splint receiving grooves in their opposed inner faces.

8. The combination of a conveyer for match splints comprising a series of splint-engaging jaws consisting of spring strips spanning several splints and yieldable to accommodate different thicknesses of adjacent splints, means for feeding the conveyer step by step, and means external to the conveyer to enter between the jaws at a plurality of points in the lengths of said strips and separate the jaws during the successive intervals of rest, said means being proportioned to permit the lines of the splints to pass on each side thereof.

9. The combination of a conveyer for match splints comprising a series of splint-engaging jaws, said jaws consisting of a plurality of alined spring strips spanning several splints and yieldable to accommodate different thicknesses of adjacent splints, means for feeding the conveyer step by step, and means external to the conveyer to enter between the jaws at a plurality of points in the length of each of said strips and separate the jaws during the successive intervals of rest, said means being proportioned to permit the lines of splints to pass on each side thereof.

10. A conveyer for match splints comprising a carrier bar, and a plurality of open-ended sections fitted around said bar and constructed with splint-engaging jaws.

11. A conveyer for matches comprising separate chains, a carrier bar connecting said chains, and a sheet metal splint holding member constructed with an angular base portion embracing the carrier bar, said member having opposed jaws provided with flat portions bearing against each other and flared longitudinal edges, the said flat portions of the jaws having coacting opposed grooves in their inner faces.

In testimony whereof I affix my signature in presence of two witnesses.

ALEXANDER KELLEY. [L. S.]

Witnesses:
    THOMAS J. BOWEN, Jr.,
    EDWARD G. COOK.